(12) United States Patent
Bankstahl et al.

(10) Patent No.: US 6,883,540 B2
(45) Date of Patent: Apr. 26, 2005

(54) FLUID MANIFOLD FOR A WELDER

(75) Inventors: Herbert A. Bankstahl, Appleton, WI (US); Joseph Gitter, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 180 days.

(21) Appl. No.: 10/064,344

(22) Filed: Jul. 3, 2002

(65) Prior Publication Data

US 2004/0003853 A1 Jan. 8, 2004

(51) Int. Cl.$^7$ ............................................. F16K 27/00
(52) U.S. Cl. ..................................... 137/594; 137/884
(58) Field of Search ............................... 137/884, 594; 184/7.4; 188/55.1

(56) References Cited

U.S. PATENT DOCUMENTS

| | | | | |
|---|---|---|---|---|
| 3,360,008 A | * | 12/1967 | Papale et al. | 137/594 |
| 3,570,534 A | * | 3/1971 | Beavers | 137/594 |
| 3,806,088 A | * | 4/1974 | Stoneman et al. | 251/367 |
| 4,887,645 A | * | 12/1989 | Kerger | 137/884 |
| 5,054,818 A | * | 10/1991 | Briet | 285/124.5 |
| 5,456,286 A | * | 10/1995 | Warner et al. | 137/594 |
| 5,497,852 A | * | 3/1996 | Little et al. | 184/7.4 |
| 6,105,724 A | * | 8/2000 | Stitz et al. | 184/7.4 |
| 6,293,305 B1 | * | 9/2001 | Soares | 137/597 |
| 6,319,399 B1 | * | 11/2001 | Peterson et al. | 210/232 |

OTHER PUBLICATIONS

Miller Air Pak Owner's Manual (OM–78) Miller Electric Manufacturing Co., Mar. 2001.
http://www.compressedairchallenge.org/content/library/sourcebook/index.htm.
www.dynamicsource.com.
www.dynamicpowerbox.com.
www.lincolnelectric.com.

* cited by examiner

*Primary Examiner*—John Fox
(74) *Attorney, Agent, or Firm*—Ziolkowski Patent Solutions Group, LLC (57) ABSTRACT

A fluid manifold usable with a welder and air compressor combination. The manifold is constructed of a single unitary manifold block and which is divided into two separate fluid communication systems that are isolated from each other by the manifold block itself. Each of the separate fluid communications systems provides various channels and external ports to access those fluid channels to enable the welder and air compressor combination to be more easily assembled and constructed by locating the manifold in a convenient location within the welder and air compressor combination and which has the necessary fluid channels and conduits already formed within the manifold so that the manufacturer or assembler can simply affix the proper fluid lines and system components to the manifold in carrying out the construction of the welder and air compressor combination and be assured that the proper fluid communication will be achieved.

31 Claims, 7 Drawing Sheets

FLUID MANIFOLD FOR A WELDER

BACKGROUND OF INVENTION

The present invention relates generally to combined welder and compressor units, and more particularly to a unit of this type having a manifold that is provided in order to facilitate the construction of the welder unit by readily enabling the connection of various fluid lines.

Portable welding and compressor units transportable to a work site are known. Typical known units include a lightweight frame consisting of metal tubing on which is mounted an internal combustion engine that is directly connected to a generator which generates an amperage to operate the unit or welder. The generator further provides auxiliary alternating current for operating auxiliary equipment, such as an air compressor. The air compressor provides compressed air for pneumatic equipment as well as certain welding applications, such as operating a plasma cutting torch. Other known portable welder and compressor units include an engine, alternator, compressor, and air tank assembly mounted within a housing along an extended length of the housing.

In such welder and air compressor units, there are, of necessity, a considerable number of components that are utilized, some of which are used to channel the main compressed air from the air compressor to desired locations and others that are used to monitor the condition of the compressed air in order to carry out certain operations or to monitor and/or control certain functions of the welder compressor unit itself. In the normal channels of commerce, many of such components are supplied separately and it is up to the constructor of the combination unit to assemble and provide fluid communication for each of such components in an manner that minimizes the time and material of such construction.

As such, one of the difficulties in constructing or assembling a compact, readily transportable welder compressor unit, is in interconnecting a large myriad of fluid conduits of differing sizes and purposes so as to make the overall welder compressor combination unit easier to assembly and to locate many of the various fluid conduits in a single, convenient location rather than have individual connections spread throughout the combination unit. Not only is the assembly time reduced but the overall unit is easier to service since many of the connections needed for servicing the combination unit are conveniently at one location.

Therefore, one of the main goals in the construction of a welder air compressor combination unit is in facilitating the assembly and mounting of the various components and to make the fluid connections between such components as simple as possible and preferably centrally and conveniently located to facilitate that construction so as to simplify the servicing of such units and to make the combination welder air compressor compact so as to be readily transportable from one location to another location.

SUMMARY OF INVENTION

The present invention is directed to an improved fluid manifold that is particularly adapted to be used with a welder and air compressor combination to facilitate the connection of the numerous fluid conduits needed for the various components used with such combination unit.

In the preferred embodiment, and as will be specifically described herein, the present manifold will be described and illustrated as being used with a welder and air compressor combination, however, it will become clear that the present manifold may be used with a wide variety of other apparatus and equipment to carry out its function of providing a convenient and central location for making certain of the fluid connections needed in the welder air compressor combination unit.

Thus, with the present invention, a manifold is provided that comprises a single unitary manifold block and which is divided into two separate fluid communication systems that are isolated from each other by the manifold block itself. Each of the separate fluid communications systems carries out the task of providing various channels and external ports to access those fluid channels to enable the welder and air compressor combination to be more easily assembled and constructed by locating the manifold in a convenient location within the welder and air compressor combination and which has the necessary fluid channels and conduits already formed within the manifold so that the manufacturer or assembler can simply affix the proper fluid lines to the manifold in carrying out the construction of the welder and air compressor combination and be assured that the proper fluid communication will be achieved.

In accordance with the preferred aspect of the present invention, an engine-driven welder and air compressor combination is disclosed and includes a compressor that provides a stream of compressed air laden with oil. An oil separator is provided mounted adjacent to the welder and air compressor combination and receives the oil laden stream of compressed air from the air compressor and separates that oil laden stream into an pressurized air stream and a separated oil source. A coalescing filter receives the compressed air from the oil separator and removes further of that oil from that stream of air. The compressed air can be used for some pneumatic equipment use and the separated oil can then be collected and reused as a lubricant and cooling medium within the combination. A manifold is provided that includes a first fluid communication system to channel the compressed air from the oil separator to a conduit leading into the coalescing filter and a second fluid communication system to channel the return flow of compressed air from the coalescing filter to an outlet in the manifold to be communicated, ultimately, to the pneumatic equipment.

In accordance with yet another aspect of the present invention, a welding and air compressor combination includes a manifold that comprises a unitary manifold block such that the fluid in the first fluid communication system and the fluid in the second fluid communication system are fluidly separated from each other. In addition, the manifold of the present invention has a number of auxiliary ports for mounting various components that are used in the control and functioning of the overall welder and air compressor combination.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
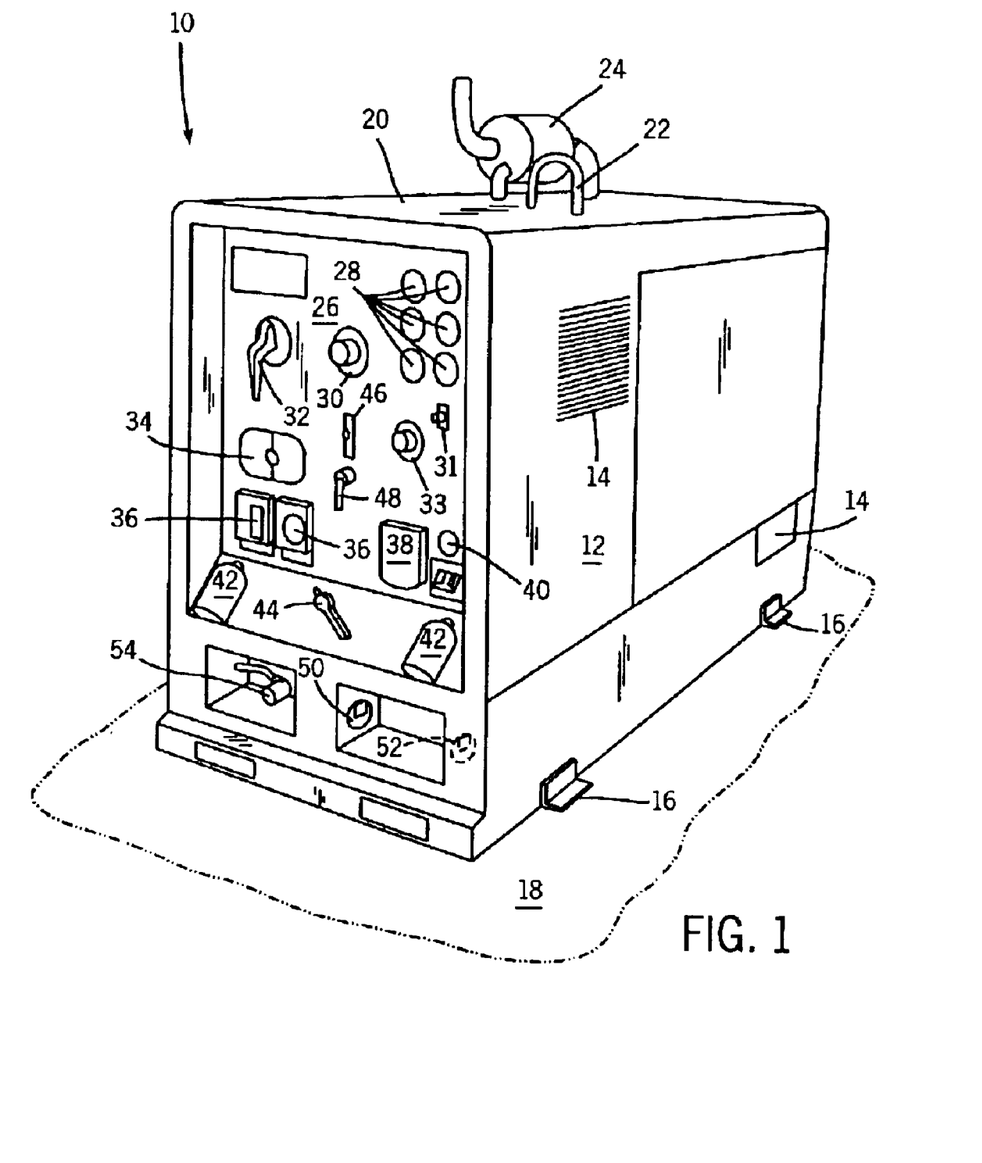
FIG. 1 is a perspective view of a welder and air compressor combination incorporating the present invention.

Referring now to FIG. 1, a portable engine-driven welder and air compressor combination or system 10 is provided and, for brevity, will hereinafter be sometimes referred to as the welder combination 10. The welder combination 10 has an outer housing 12 that has one or more air vents 14 for cooling internal components of the welder combination 10. The housing 12 can be easily removed to permit access to the internal components for maintenance and service. A plurality of support members 16 provide stabilization for the welder combination 10 when placed on a generally level surface, such as surface 18. An upper surface 20 of the welder combination 10 includes a lifting hook 22 extending therethrough for lifting and transporting of the welder combination 10. Also attached to the upper surface 20 is an exhaust system 24 that lowers noise and removes exhaust gas from the welder combination 10.

The welder combination 10 includes a control panel 26 that has various control elements and gauges for operating the welder combination 10. A plurality of gauges 28 measure various parameters of the welder combination 10. Measured parameters can include oil pressure, fuel level, oil temperature, battery amperage, air pressure, and engine running time of the welder combination 10. Control panel 26 also has a control dial 30 and an ampere range switch 32 which are used to select a voltage/amperage for welding operations. Process selector switch 34 selects the type of weld output. The weld output is determined by the type of welding process. Examples of weld processes that may be implemented include stick welding, TIG welding, air-carbon arc cutting, and various wire feed processes. Electrical outlets 36 provide power for electrically driven devices, such as saws, drills, etc. Control panel 26 also includes a compressor on/off switch 31 and an engine control switch 33 to independently control the compressor and engine, respectively.

The control panel 26 also includes multiple power connections such as a single phase power connect 38, an optional three-phase power connect 40, and weld-power receptacles 42. An optional polarity switch 44 can be used to select the polarity of the weld output. Typical selections include direct current electrode negative, direct current electrode positive, and alternating current. A panel remote switch 46 and remote receptacle 48 select remote control of the welder combination 10 in instances where welding operations are remotely located from the welder combination 10. Positive 50 and negative 52 battery charge connections are used for battery jumpstart or charging, and are positioned adjacent to a system output or shut-off valve 54. Upon engaging of the compressor clutch and opening of valve 54, compressed air is supplied for air assisted carbon arc cutting or to air driven power tools and other pneumatic operations.

Figure 2:
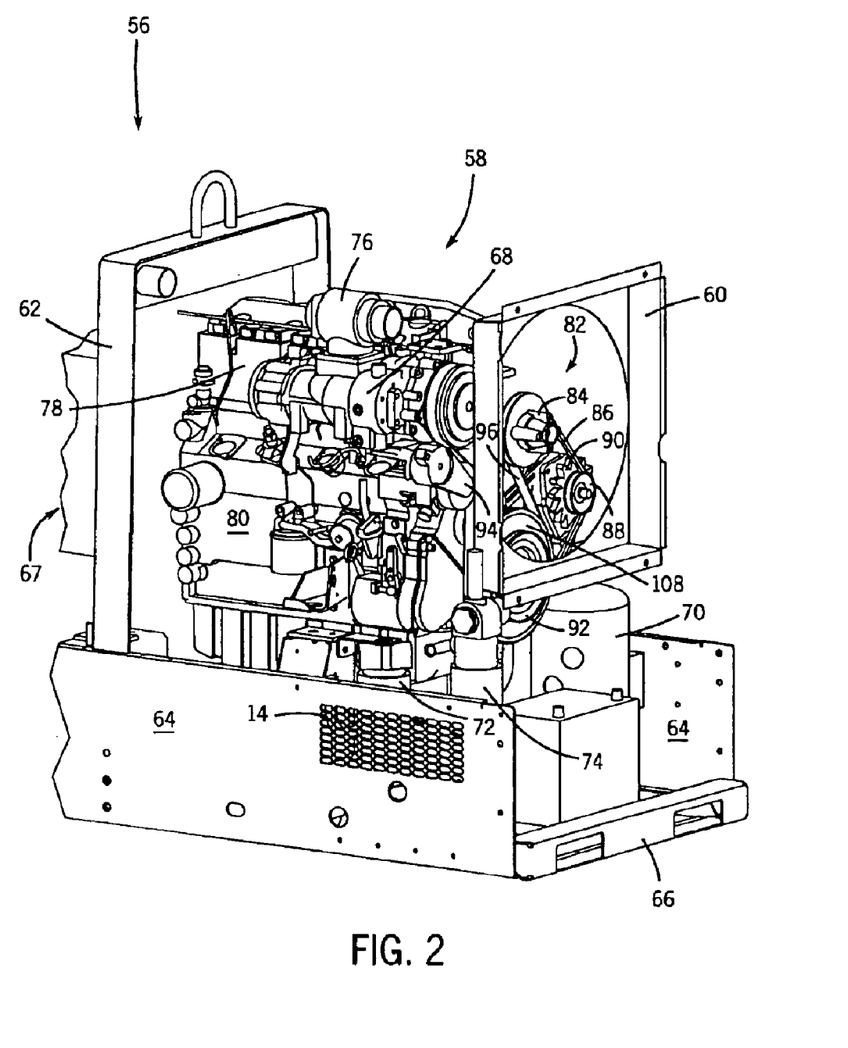
FIG. 2 is a perspective view of a portion of the welder and air compressor combination with a housing cover removed.

Referring now to FIG. 2, a perspective view of a portion 56 of the welder combination 10 of FIG. 1 is shown with the housing cover 12 removed. An internal combustion engine 58 is mounted to a frame assembly 64 between a radiator shroud 60 and a lifting eye support member 62. The engine 58, in a preferred embodiment, is oil cooled and configured to recirculate engine cooling oil. The lifting eye support member 62 secures to the frame assembly 64 for structural support during lifting of the welder combination 10. The frame assembly 64 has air vents 14 that permit air flow through the welder combination 10 to cool the internal components. Cross-brace 66 provides structural support for the frame assembly 64. An electrical generator 67 configured to generate an arc welding current is mounted within the housing 12 of the welder combination 10 and driven by the engine 58. The welder combination further includes a screw air compressor 68 mounted to the engine 58 that is configured to provide compressed air to the shut-off valve 54 of FIG. 1. The screw air compressor 68 is fluidly connected to an oil separator 70, a coalescing filter 72, which combine to separate oil from an air/oil mixture and a first particle oil filter.

The internal combustion engine 58 of the welder combination 10 includes an air intake connected to an intake manifold and engine head 78. The engine head 78 is mounted to an engine block 80, which collectively form the engine 58. A pulley arrangement 82 is bolted to both the engine head 78 and the engine block 80 and includes a fan blade hub 84 rotated by a first drive belt 86, such as a serpentine belt. The first drive belt 86 further connects to an alternator pulley 88 that drives an alternator 90 by a first crankshaft pulley 92. A belt tensioner 94 connects to a mounting bracket to maintain tension on a second drive belt 96 that drives the screw air compressor 68 driven by a second crankshaft pulley 108.

Figure 3:
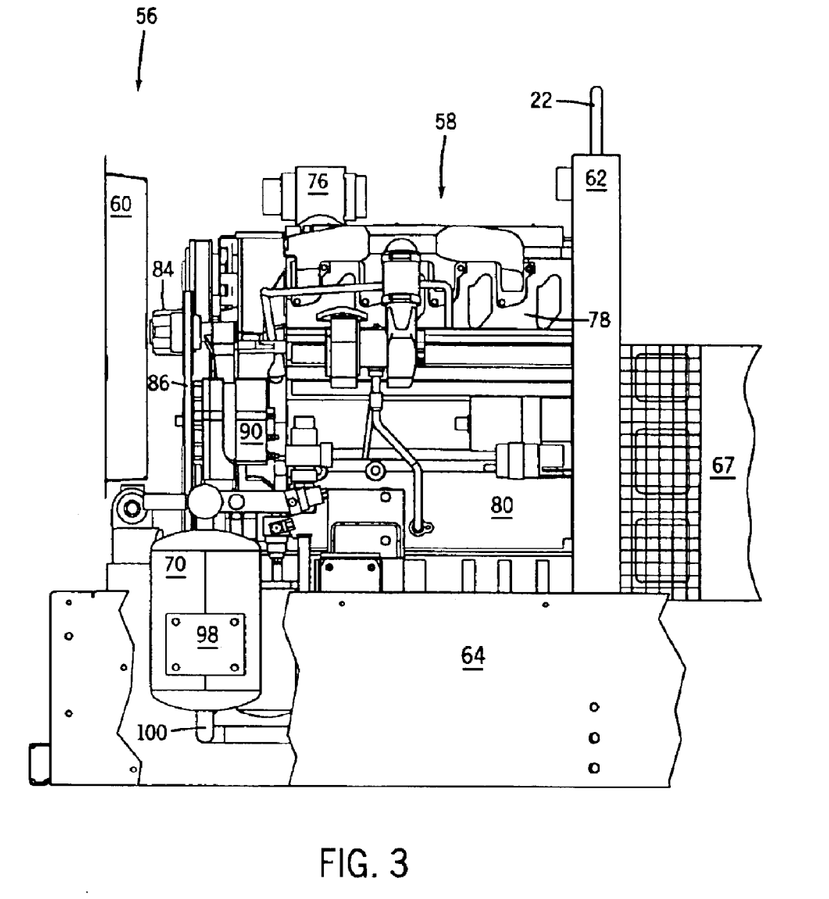
FIG. 3 is a side view of the welder and air compressor combination of FIG. 2.

Referring now to FIG. 3, a side view of the portion 56 of FIG. 2 is shown. Frame assembly 64 connects to support member 62 which is attached to lifting eye 22. The internal combustion engine 58 is shown having fan blade hub 84 attached to the engine head 78 as previously discussed with reference to FIG. 2. A fan (not shown) is attached to fan blade hub 84 that is housed in the radiator shroud 60. Engine block 80 has alternator 90 mounted thereto which is driven by the first drive belt 86. The electrical generator 67 mounts to the engine block 80 and is rotated by the engine 58 to generate the arc welding current used in welding operations. Oil separator 70 is mounted to the frame assembly 64 with a mounting plate 98. An oil return line 100 of the oil separator 70 connects the oil separator 70 to other equipment, such as a radiator and ultimately back to the air compressor 68 (FIGS. 1–3) for cooling and lubrication thereof.

Figure 4:
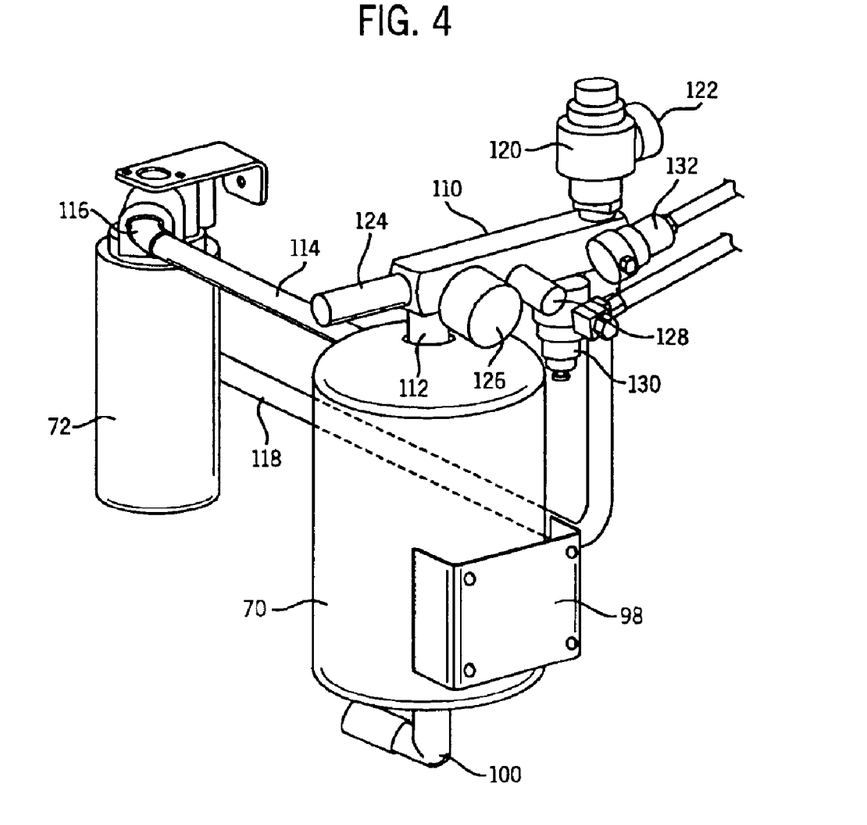
FIG. 4 is a perspective view of the fluid manifold constructed in accordance with the present invention.

FIG. 4 is a perspective view of the manifold 110 that is used with the present invention and is shown along with oil separator 70 and coalescing filter 72. In this Figure, the oil separator 70 receives a stream of compressed air laden with oil from the air compressor 68 (FIGS. 1–3) through an inlet (not shown). That stream of compressed air laden with oil passes through the oil separator 70 where the air, separated therefrom is discharged through an oil separator outlet 112 and enters the manifold 110 through a first main inlet port (not shown) in the manifold 110. The oil that is separated from the stream of compressed air laden with oil and which is, in turn, discharged downwardly from the oil separator 70 to the oil return line 100. The oil separator 70 is affixed firmly in position to the welder combination 10 by means of the mounting plate 98.

Continuing with the flow of the compressed air, it enters the manifold 110 via the first main inlet (not shown) of the manifold 110 and is channeled through the manifold 110 through a first main passageway and into a first main outlet (not shown) in the manifold 110 and thereafter enters a first fluid conduit 114 where the compressed air, now having most of the oil removed therefrom, flows into an inlet 116 in the coalescing filter 72 where a filter media removes additional oil from that stream of compressed air.

The stream of compressed air that is discharged through an outlet (not shown) in the coalescing filter 72 and passes through a second fluid conduit 118 where it returns to a second main inlet (not shown) in the manifold 110 where that stream of compressed air further travels through the manifold 110 through a second main passageway and is discharged from manifold 110 through a minimum pressure valve 120 to an outlet 122 where the stream of compressed air is thereafter communicated to an outlet or other device for supplying the compressed air to an end use device such as pneumatic equipment. The minimum pressure valve 120 maintains a minimum air pressure at the compressor outlet port to assure adequate oil flow for lubrication and cooling of the compressor.

As further shown in FIG. 4, other components are effectively and efficiently affixed to the manifold 110 including a safety relief valve 124 that is set at some predetermined pressure in excess of the normal pressure conditions of the overall pressure system of the welder combination 10 so that the pressure will be relieved in the event that the pressure exceeds that set value. The pressure relief valve is affixed directly to the manifold 110 by means of an auxiliary port (not shown) and communicates with the flow of the compressed air that passes through the first main passageway in the manifold 110 by means of an auxiliary port that will be later explained.

Other components that are used with the present manifold 110 include a pressure gauge sender unit 126 that senses the pressure in the first main passageway in the manifold 110 and provide a electrical signal to a remote pressure display that is indicative of the pressure within the first main passageway. As a further component, there is a minimum pressure switch 128 that also senses the pressure of the fluid flowing within the first main passageway of the manifold 110 and prevents the compressor clutch from engaging if the system pressure is above a preset value. This protects the clutch from excessive wear. With each of the components of the pressure gauge sender unit 126 and the minimum pressure switch 128 there is an auxiliary port formed in the manifold 110, however, both of those components may be combined so as to be operative from one auxiliary port rather than two as shown in the embodiment of FIG. 4.

There is also a bleed down valve 130 affixed to a further auxiliary port formed in the manifold 110 and which communicates with the second main passageway in the manifold 110 and also a pressure feedback sensor 132 that is also provided that communicates with an air intake controller to control the intake air pressures, that is, if the air present in the system rises, the pressure feedback sensor 132 acts to shut down in the intake air to the air compressor 68 (FIGS. 1–3) and conversely, as the air pressure in the system drops, the pressure feedback sensor 132 makes an adjustment to admit more air into the air compressor 68. Again that component, the pressure feedback sensor 132 also communicates with the second main passageway in the manifold 110.

Figure 5:
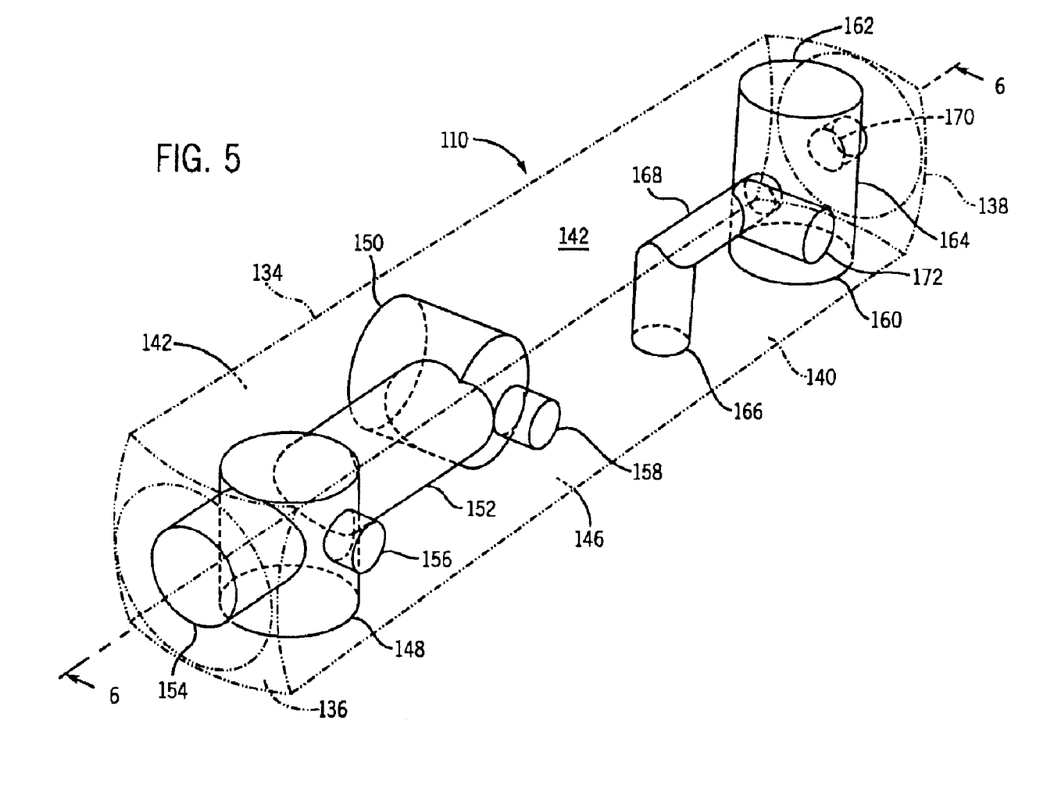
FIG. 5 is a schematic view of the present manifold showing the various ports and internal passageway within the manifold.

Turning now to FIG. 5, taken along with FIG. 4, there is shown a schematic view of the manifold 110 constructed in accordance with the present invention and, as can be seen, the manifold 110 is a generally elongated unitary manifold block 134 having a longitudinal axis, a first end 136 and a second end 138, for purposes of explaining the invention, and having a number of bores made therein to carry out the purposes of this invention. As can be seen, the unitary manifold block 134 is a single, unitary, piece of material, preferably metal, and all of the passageways and bores, and ports hereinafter to be described are formed in that unitary piece of material.

For purposes of explaining the present invention, the differing surfaces will be referred to as the front surface 140, rear surface 142, top surface 142 and bottom surface 144, however it will be seen that the various ports and functions of the present manifold 110 can be carried out without having the ports in certain specified surfaces of the manifold 110.

Accordingly in FIG. 5, the first main inlet port 148 is shown and which is formed by a blind bore cut into the bottom surface 146 of the unitary manifold block 134, that is, when the first main inlet port 148 is formed, the bore does not pass fully through the manifold block 134. As such, therefore, the first main inlet port 148 is, in the preferred embodiment, a pipe thread port with a diameter of about ¾ inches so as to receive the male threaded outlet 112 from the oil separator 70 (FIG. 4) and is formed at generally a right angle with respect to the longitudinal axis of the elongated manifold block 134. As such, the fluid coupling between the manifold 110 and the oil separator 70 is easily accomplished and is convenient to be carried out in the construction of the welder combination 10.

In a similar manner, a bore is made in the rear surface 142 of the unitary manifold block 134 to form a first main outlet port 150 such that, in the preferred embodiment, the longitudinal axis of the first main inlet port 148 and the longitudinal axis of the first main outlet port 150 are spaced about 90 degrees apart in the unitary manifold block 134. Again it is preferred that the first main outlet port 150 be a ¾ inch pipe thread female connection. A first main passageway 152 is provided to allow fluid communication between the first main inlet port 148 and the first main outlet port 150 so that the fluid entering the first main inlet port 150 from the oil separator 70 (FIG. 4) can pass directly to the first main outlet port 150 in accordance with the explained flow path of the flow streams given with respect to FIG. 4.

Accordingly, there can be seen that there is a first fluid communication system that is provided in the first end 136 of the unitary manifold block 134 that establishes a fluid path from the first main inlet port 148 to the first main outlet port 150 through the first main passageway 152. In addition, there may be at least one additional auxiliary port formed in the first fluid communication system located at the first end 136 of the unitary manifold block 134. One of such auxiliary ports is shown as first auxiliary port 154 that is formed along the longitudinal axis of the unitary manifold block 134 in the first end 136 thereof and is oriented generally along the longitudinal axis of the elongated unitary manifold block 134. A second auxiliary port 156 is also formed in the first end 136 of the manifold block 134 and which also communicates with the first fluid communication system, that is, second auxiliary port 156 sees the pressure within the first main passageway 152. The second auxiliary port 156 is preferably formed in the front surface 140 of the manifold block 134 and is sized to be a ⅛ the inch pipe thread so that the pressure gauge sender unit 126 can be easily and readily affixed to the manifold 110.

As an option, the may also be another auxiliary port, shown as a third auxiliary port 158 that is also formed in the front surface 140 of the manifold block 134 and which is also preferably a ⅛ inch pipe thread and which communicates with the first main passageway 152 and can be used to locate and affix the minimum pressure switch 128 therein. In a preferred embodiment, however, the third auxiliary port 158 can be eliminated and a tee (not shown) can be used with the second auxiliary port 156 so that both the pressure gauge sender unit 126 and the minimum pressure switch 128 can both be operated from the second auxiliary port 156, in which case, the third auxiliary port 158 can, obviously, be eliminated and thus results in a manifold block 134 requiring less operations in its construction.

In any event, as can now be seen with respect to the first end 136 of the manifold block 134, the are a number of ports that all are preferably provided with female pipe thread fitting so that the desired components and conduits can easily be affixed to the manifold 110 and the correct fluid communication immediately established, thus the construction of the welder combination 10 is simpler to assemble and the manifold 110 allows the correct fluid communication to be automatically established by the making of simple, easy to install, connections with the various components. As such, the present manifold 110 can carry out considerable of centrally located connections that would otherwise have to be made in a myriad of locations throughout the welder combination 10 and some of which could end up in relatively inaccessible and difficult to reach locations and make the construction, as well as the later maintenance of the welder combination 10, quite difficult.

Taking next, the second end 138 of the manifold block 134, there is formed a second fluid communication system and which comprises a second main inlet port 160 and a second main outlet port 162 and which can be constructed by a straight bore formed straight through the manifold block 134 such that the second main inlet port 160 and the second main outlet port 162 are coaxially aligned, each of which are ¾ inch female pipe threads. As such, the second main inlet port 160 opens outwardly in the bottom surface 146 of the manifold block 134 and the second main outlet port 162 is formed in the top surface 144 of the manifold block 134. Accordingly, the second fluid conduit 118 that channels the compressed air from the coalescing filter 72 is connected to the manifold 110 at the second main inlet port 160 where the compressed air passes through the manifold 110 through a second main passageway 164 to the second main outlet port 162 that, in turn, has the minimum pressure valve 120 affixed thereto. Preferably the second main inlet port 160 and the second main outlet port 162 are ¾ inch female pipe thread fittings.

As with the first fluid communication system, there is at least one auxiliary port formed in the second fluid communication system and a first auxiliary port 166 is formed in the bottom surface 146 of the manifold block 134 and is, preferably, a ¼ inch pipe thread female fitting. The longitudinal axis of the first auxiliary port 166 is, therefore, parallel to the longitudinal axis of the second main passageway 164 formed in the first end 136 of the manifold block 134. An auxiliary passageway 168 communicates the fluid between the first auxiliary port 166 and the second main passageway 164 and which is generally formed along the longitudinal axis of the elongated manifold block 134. The auxiliary passageway 168 can be formed by means of a bore 170 made in the second end 138 of the manifold block 134 and after the auxiliary passageway 168 has been formed, the bore 170 is simply plugged at that second end 138 so that the bore 170 no longer exists in the outer surface of the second end 138. Thus the bleed down valve 130 can be readily and conveniently affixed into the first auxiliary port 166 of the second end 138 of the manifold block 134.

A second auxiliary port 172 is also provided in the second fluid communication system and opens outwardly into the front surface 140 of the manifold block 134. That second auxiliary port 172 is preferably a ¼ inch female pipe thread and into which is affixed the pressure feedback sensor 132 easily and conveniently and communicates with the auxiliary passageway 168 of the manifold block 134 and associated with the second fluid communication system.

As can now be seen, the first fluid communication system that is located at the first end 136 of the manifold block 134 and the second fluid communication system that is formed in the second end 138 of the manifold block 134 are separate and fluidly isolated systems, that is, there is no fluid communication between the first and second fluid communication systems, since any such communication is blocked by the solid material of the manifold block 134 itself.

Figure 6:
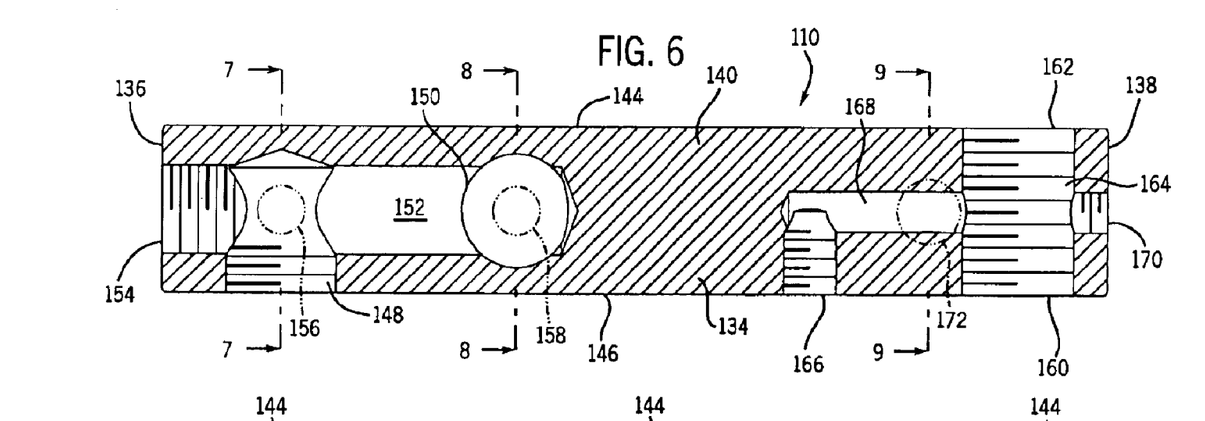
FIG. 6 is a side, cross sectional view of the manifold of the present invention.

Turning now to FIG. 6, there is shown a side cross sectional view taken along the line 6—6 of FIG. 5. In FIG. 6, there can be seen the present manifold 110 comprised of the unitary manifold block 134 having formed therein the first fluid communication system comprising a first main inlet port 148 that receives the compressed air from oil separator 70 (FIG. 4) and a first main outlet port 150 that discharges that compressed air to the coalescing filter 72 and is, therefore, connected to the first fluid conduit 114. As has been noted, both the first main inlet port 148 and the first main outlet port 150 are threaded and are preferably both ¾ inch pipe thread female connections. As also seen, the first auxiliary port 154 is formed in the first end 136 of the unitary manifold block 134 and is preferably a ½ inch pipe thread fitting. The further second and third auxiliary ports 156, 158, are both formed in the front surface 140 of the manifold block 134 are shown and which are preferably ⅛ inch pipe thread fittings.

In the second fluid communication system, located at the second end 138 of the manifold block 134, there is formed the second main inlet port 160 and the second main outlet port 162 that are coaxially formed therein and which are, as explained, preferable ¾ inch pipe thread fittings. The bore 170 is also seen to be plugged such that there is no communication with the second end 138 to the external environment. The first auxiliary port 166 and second auxiliary port 172 and also formed, respectively, in the bottom surface 146 and the front surface 140 and the auxiliary passageway 168 communicates with the second main passageway 164 intermediate the second main inlet port 160 and the second main outlet port 162.

Figure 7:
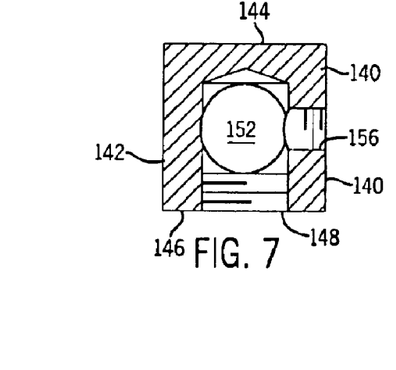
FIG. 7 is a lateral cross sectional view of the manifold taken along the line 7—7 of FIG. 6.

Turning now to FIG. 7, there is shown an end cross sectional view taken along the line 7—7 of FIG. 6 and illustrating the first main inlet port 150 as well as the second auxiliary port 156 that are oriented at about 90 degrees with respect to each other.

Figure 8:
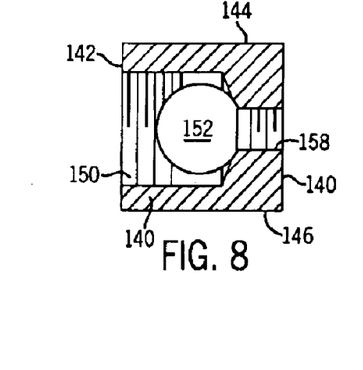
FIG. 8 is a lateral side cross sectional view taken along the line 8—8 of FIG. 6.

In FIG. 8, there is shown an end cross-sectional view taken along the line 8—8 of FIG. 6 and illustrating the first main outlet port 150 oriented generally at 90 degrees to the first main inlet port 148 (FIG. 7) and the third auxiliary port 158 that extends outwardly coaxially with the first main outlet port 150.

Figure 9:
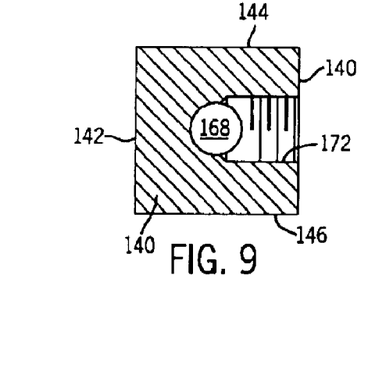
FIG. 9 is a lateral side cross sectional view taken along the line 9—9 of FIG. 6.

In FIG. 9, there is an end cross sectional view taken along the line 9—9 of FIG. 6 and showing the second auxiliary port 172 of the second fluid communication system in the second end 138 of the manifold block 134 as well as the auxiliary passageway 168 formed therein. The second auxiliary port 172 is formed as a ⅛ inch pipe thread fitting.

Figure 10:
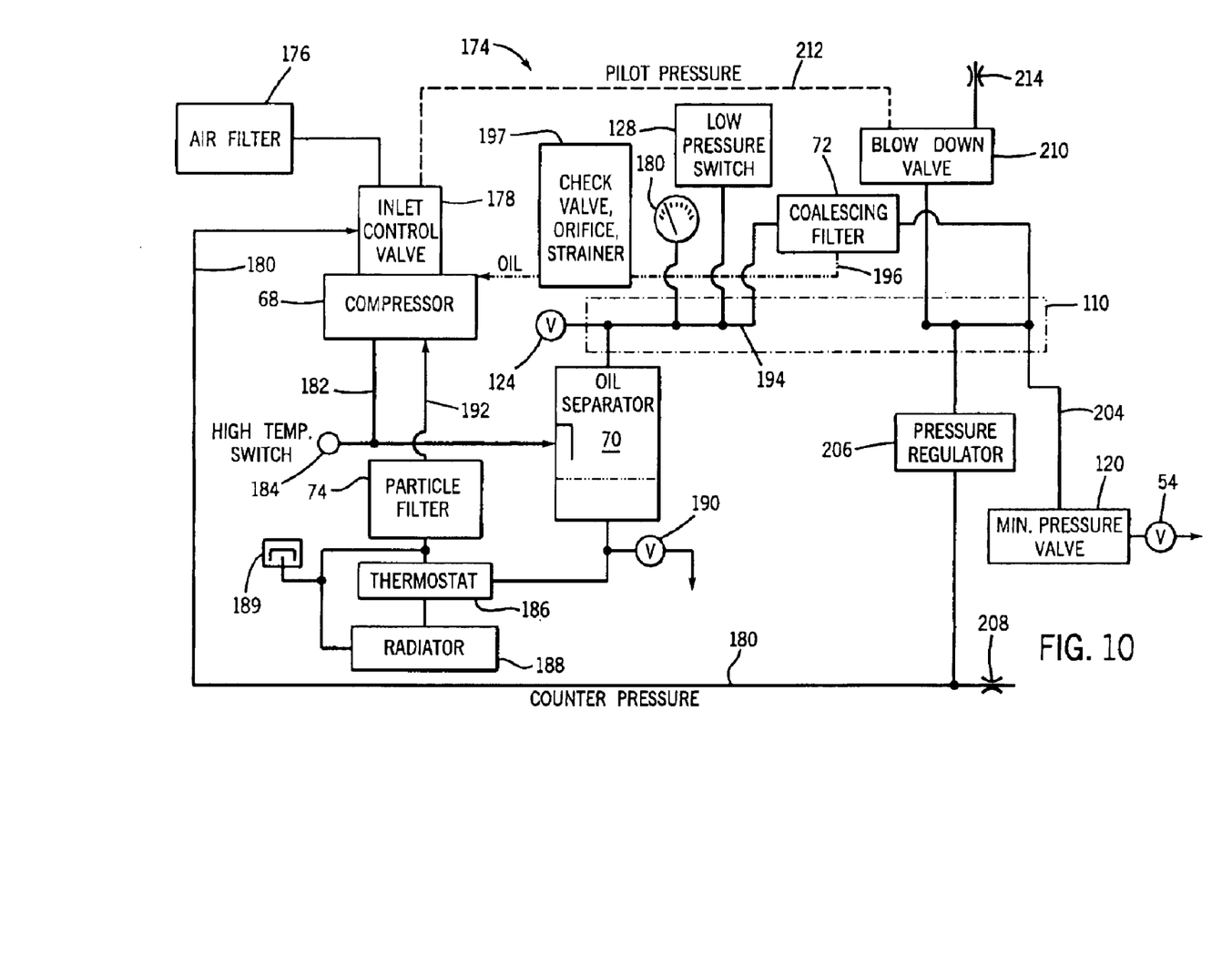
FIG. 10 is a schematic view of the welder and air compressor combination oil and compressed air system showing the manifold of the present invention used therein.

Turning now to FIG. 10, there is shown a schematic view of the compressor air and oil routing system 174 utilizing the manifold 110 constructed in accordance with the present invention. The compressor system 174 includes an air filter 176 that directs ambient air to an inlet control valve 178. Air pressure along line 180 controls the inlet control valve 178, which regulates air flow into the air compressor 68 of FIG. 2. The air compressor 68 provides a compressed air/oil mixture along line 182 to the oil separator 70. A high temperature switch 184 monitors the temperature of the air/oil mixture and is configured to open a contact (not shown) to disable the magnetic clutch assembly 107 of FIG. 3 if the temperature exceeds a predetermined limit. After passing through the oil separator 70, oil exits the oil separator 70 and enters a cooling system that includes a thermostat 186 and a radiator 188. A manually controlled drain valve 190 is supplied to drain oil from the oil separator 70. The radiator 188 acts as a dual purpose radiator having two cooling chambers. One of the two chambers cools compressor oil and the other chamber cools engine coolant by circulating engine oil therethrough. Collectively, the oil separator 70, first particle filter 74, thermostat 186, and radiator 188 form a compressor oil cooler assembly capable of reducing the temperature of the filtered oil that returns to the air compressor 68 along line 192. An oil fill 189 is also provided in-line between the radiator and the thermostat.

The thermostat 186 includes a control valve that directs oil to either the radiator 188 or the first particle filter 74. When oil is selected by the control valve to pass through the radiator 188, it also passes through the first particle filter 74 after flowing though the radiator 188 and oil fill 189. After passing through the first particle filter 74, the oil enters the air compressor 68. The air, including a small amount of remaining oil mist, exiting from the oil separator 70 flows through a system that includes the distribution manifold 110 of the present invention. A safety valve 124 is provided to limit the pressure in line 194. Air pressure gauge 193 is provided to monitor line 194. The minimum pressure switch 128 is also connected to line 194 to prevent restart of the compressor 68 until pressure in the manifold 110 has reached a pre-set low value.

After entering the manifold 110, the air/oil mixture from line 194 flows through the coalescing filter 72. Oil is routed along line 196 back to the air compressor 68 through a check valve, orifice, and strainer assembly 197. Air exiting from the coalescing filter 72 is delivered to a minimum pressure valve 120 by line 204. If the pressure along line 204 is sufficient, air will pass through the minimum pressure valve 120 to the shut-off valve 54 of FIG. 1, which provides compressed air for pneumatic operations of the welder combination 10. Using air received from the coalescing filter 72, a pressure regulator 206 regulates air pressure along control pressure line 180 in conjunction with a bleed orifice 208. Pressure inline 180 controls the position of inlet control valve 178. Air can also pass from the coalescing filter 72 into a blow-down valve 210 and exit the compressor system 172 through bleed down orifice 214. Pilot pressure inline 212 is low during compressor operation and will rise upon shut down. This pressure rise will open blowdown valve 210 to release the high pressure air from the system 172 to the atmosphere through orifice 214 at a controlled rate.

As can therefore be seen, the manifold 110 provides the various connections and passageways for the overall compressor air an oil routing system 174 so that the individual flows of compressed air can be readily accessed and routed to the necessary components. As also can be seen, the present manifold 110 allows the construction and assembly of the present welder combination 10 to be simplified as it provides physical support as well as proper operational connections for a variety of system components.

In accordance with one aspect of the present invention, a welder and air compressor combination includes an air compressor that provides a stream of compressed air containing a quantity of oil. The air containing the oil is directed to an oil separator where the air and the oil are separated. The separated air is then routed through a manifold that has a number of different ports and passageways to enable the construction of the combination by simply attaching fluid conduits and components to the manifold where the internal passageways and fluidly isolated fluid communication systems are formed to carry out the necessary connections for such fluid conduits and components.

The present invention has been described in terms of the preferred embodiment, and it is recognized that equivalents, alternatives, and modifications, aside from those expressly stated, are possible and within the scope of the appending claims.

What is claimed is:

1. A fluid manifold comprising:
   a unitary manifold block, said manifold block being elongated and having first and second ends;
   a first fluid communication conduit system in said first end and a second fluid communication conduit system in said second end of said unitary manifold block, said unitary manifold block providing fluid isolation between said first fluid communication system and said second fluid communication system;
   said first fluid communication system comprising a first inlet port adapted to receive a first main flow of fluid, a first main outlet port for discharging that first main flow of fluid and a first main passageway within said unitary manifold block communicating between said first main inlet port and said first main outlet port, and at least one first auxiliary port formed in said unitary manifold block in unrestrictable flow communication with the first main flow of fluid passing between said first main inlet port and said first main outlet port; and
   said second communication system comprising a second main inlet port adapted to receive a second main flow of fluid and a second main outlet port for discharging that second main flow of fluid, and at least one second auxiliary port formed in said unitary manifold block in unrestrictable flow communication with the second main flow of fluid passing between said second main inlet port and said second main outlet port.

2. A fluid manifold as defined in claim 1 wherein said at least one first auxiliary port comprises an auxiliary port formed in said unitary manifold block and oriented 90 degrees with respect to said first main inlet port.

3. A fluid manifold as defined in claim 2 wherein said first auxiliary port is a pipe thread fitting of a smaller diameter than said main outlet port.

4. A fluid manifold as defined in claim 1 wherein said elongated unitary manifold block has a main longitudinal axis, and wherein said first main passageway is formed parallel to the main longitudinal axis of said unitary manifold block.

5. A fluid manifold as defined in claim 1 wherein aid first main inlet port and first said main outlet port are formed in said unitary manifold block at approximately 90 degrees apart.

6. A fluid manifold as defined in claim 1 wherein said at least one first auxiliary port comprises an auxiliary port formed in said unitary manifold block at about 90 degrees to said main longitudinal axis of said unitary manifold block.

7. A fluid manifold as defined in claim 1 wherein said at least one first auxiliary port comprises first and a second auxiliary ports, each communicating with the first main flow of fluid passing between said first main inlet port and said first main outlet port, said second auxiliary port being parallel to the main longitudinal axis of said elongated unitary manifold block.

8. A fluid manifold as defined in claim 1 wherein said second main inlet port and said second main outlet port are coaxially formed in said unitary manifold block.

9. A method of providing communication between a plurality of fluid conduits and auxiliary components, said method comprising the steps of:

providing a unitary manifold block having at least a first and a second fluid communication systems that are fluidly isolated from each other, each systems having a main inlet port, a main outlet port and a main passageway communicating therebetween for passing a main flow of a fluid between said main inlet ports and said main outlet ports, and said unitary manifold block further having at least one auxiliary port communicating with first and second fluid communication systems;

connecting the plurality of fluid conduits to said at least first and said second fluid communication systems; and connecting auxiliary components to said manifold in communication with one of said at least first and second fluid communication systems and providing physical support for said auxiliary components.

10. A method as defined in claim 9 wherein said step of connecting auxiliary components comprises connecting a safety relief valve to said manifold block to be in communication with said first fluid communication system.

11. A method as defined in claim 9 wherein said step of connecting auxiliary components comprises connecting a minimum pressure valve to said manifold block to be in communication with said second fluid communication system.

12. A method as defined in claim 9 wherein said step of providing a unitary manifold block comprises providing an elongated manifold block having a longitudinal axis and where the main passageway of said first fluid communication system is formed along said longitudinal axis.

13. A fluid manifold comprising:

a unitary manifold block, the manifold block being elongated and having first and second ends;

a first fluid communication conduit system in the first end and a second fluid communication conduit system in the second end of the unitary manifold block, the unitary manifold block providing fluid isolation between the first fluid communication system and the second fluid communication system;

the first fluid communication system comprising a first main inlet port adapted to receive a first main flow of fluid, a first main outlet port for discharging that first main flow of fluid and a first main passageway within to unitary manifold block communicating between the first main inlet port and the first main outlet, and at least two auxiliary ports formed in the unitary manifold block in communication with the first main flow of fluid passing between the first main inlet port and the first outlet port, wherein one of the at least two auxiliary ports is positioned parallel to the main longitudinal axis of the unitary manifold block; and the second communication system comprising a second main inlet port adapted to receive a second main flow of fluid and a second main outlet port for discharging that second main flow of fluid, and at least one auxiliary port formed in the unitary manifold block in communication with the second main flow of fluid passing between to second main inlet port and the second main outlet port.

14. The manifold of claim 13 wherein the inlet ports and auxiliary ports have diameters, the diameters of the auxiliary ports being smaller than the diameters of the inlet ports.

15. The manifold of claim 13 wherein one of the first and second main inlet ports, main outlet ports, and a connecting passage therebetween are coaxially formed in the unitary manifold block.

16. The manifold of claim 13 wherein the first main inlet port and the second main inlet port are disposed parallel to one another.

17. A system for providing fluid communication between plurality of fluid conduits and fluid components, the system comprising:

an elongated, unitary manifold block having a first end containing within a first fluid communication system and a second end containing within a second fluid communication system, the manifold block providing fluid isolation between the first and second fluid communication systems;

the first fluid communication system comprising a first main inlet port to receive a first main flow of fluid, a first main outlet port for discharging the first main flow of fluid, a first main passageway providing fluid communication between the first main inlet port and the first main outlet port, and at least one first auxiliary port in communication with the first main flow of fluid;

the second fluid communication system comprising a second main inlet port to receive a second main flow of fluid, a second main outlet port for discharging the second main flow of fluid, a second main passageway providing fluid communication between the second main inlet port and the second main outlet port, at least one second auxiliary port in communication with the second main flow of fluid; and wherein one of the first and second main inlet ports, main outlet ports, and a connecting passage therebetween are coaxially formed in the manifold block.

18. The system of claim 17 further comprising at least three auxiliary ports in parallel alignment.

19. The system of claim 18 further comprising a total of five auxiliary ports.

20. The system of claim 17 wherein the inlet ports and auxiliary ports have diameters, the diameters of the auxiliary ports being smaller than the diameters of the inlet ports.

21. The system of claim 17 wherein the first main inlet and the second main inlet are positioned parallel to one another.

22. A fluid manifold comprising:

a manifold having formed therein two fluid communication systems and providing fluid isolation between the two fluid communication systems; an wherein the two fluid communication systems each have a main inlet port, a main outlet port, a main passageway providing fluid communication between the main inlet and main outlet ports, and at least one auxiliary port in communication with the main flow of fluid and being of a smaller diameter than the main inlet port.

23. The manifold of claim 22 further comprising at least three auxiliary ports in parallel alignment.

24. The manifold of claim 22 further comprising a total of five auxiliary ports.

25. The manifold of claim 22 wherein the main inlet ports of the two fluid communication systems are positioned parallel to one another.

26. The manifold of claim 22 wherein the main inlet port, main outlet port, and a connecting passage therebetween of one of the two fluid communication systems are coaxially formed in the manifold.

27. A fluid communication apparatus comprising:

an elongated, unitary, fluid communication block having first and second ends, a plurality of fluid conduits therewithin, and providing fluid isolation between a first fluid communication system and a second fluid communication system;

the first fluid communication system disposed in the first end of the fluid communication block, and comprising a first main inlet port adapted to receive a first main flow of fluid and parallel to a second main inlet port, a first main outlet port for discharging the first main flow of fluid, a first main passageway within the unitary manifold block providing fluid communication between the first main inlet port and the first main outlet port, and at least one first auxiliary port formed in the fluid communication block in communication with the first main flow of fluid passing between the first main inlet and outlet ports; and the second communication system disposed in the second end of the fluid communication block, and comprising a second main inlet port adapted to receive a second main flow of fluid and parallel to the first main inlet port, a second main outlet port for discharging the second main flow of fluid, a second main passageway within the fluid communication block providing fluid communication between the second main inlet port and the second main outlet port, and at least one second auxiliary port formed in the unitary manifold block in communication with the second main flow of fluid passing between the second main inlet and outlet ports.

28. The apparatus of claim 27 further comprising at least three auxiliary ports in parallel alignment.

29. The apparatus of claim 27 further comprising a total of five auxiliary ports.

30. The system of claim 27 wherein the inlet ports and auxiliary ports have diameters, the diameters of the auxiliary ports being smaller than the diameters of the inlet ports.

31. The apparatus of claim 27 wherein one of the first and second main inlet ports, main outlet ports, and a connecting passage therebetween are coaxially formed in the fluid communication block.

* * * * *

UNITED STATES PATENT AND TRADEMARK OFFICE
CERTIFICATE OF CORRECTION

PATENT NO. : 6,883,540 B2
DATED : April 26, 2005
INVENTOR(S) : Bankstahl et al.

It is certified that error appears in the above-identified patent and that said Letters Patent is hereby corrected as shown below:

Column 10,
Lines 31 and 64, delete "clongated" and substitute therefor -- elongated --;
Line 38, insert -- main -- after the word "first";

Column 12,
Line 12, delete "to" and substitute therefore -- the --;
Line 24, insert -- a -- after the word "between";
Line 65, delete "an" and substitute therefor -- and --.

Signed and Sealed this

Eleventh Day of October, 2005

JON W. DUDAS
*Director of the United States Patent and Trademark Office*